I. H. Garretson,
Brick Machine.
No. 56,742.   Patented July 31, 1866.
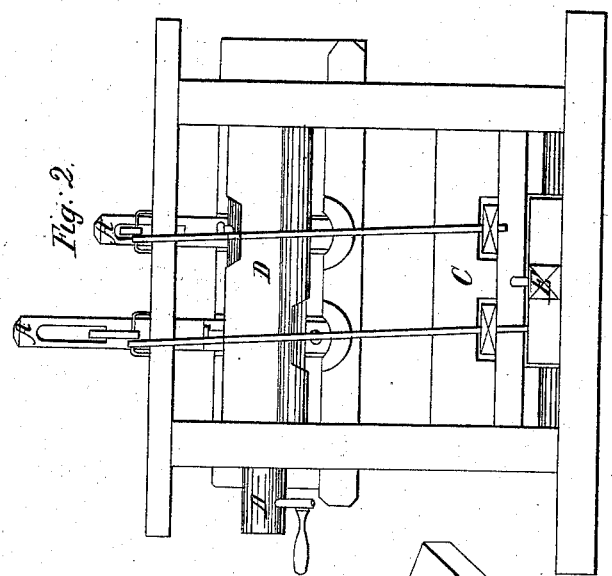
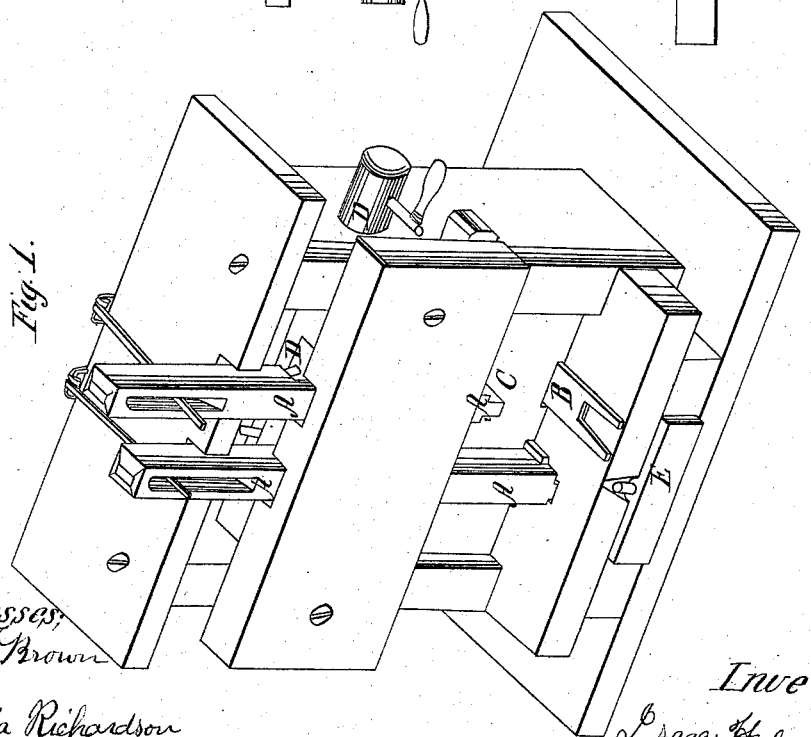
Witnesses:
Edw. T. Brown
Marcia Richardson
Inventor;
Isaac H. Garretson

UNITED STATES PATENT OFFICE.

ISAAC H. GARRETSON, OF RICHLAND, IOWA.

IMPROVED PROCESS FOR MAKING BRICK.

Specification forming part of Letters Patent No. 56,742, dated July 31, 1866.

*To all whom it may concern:*

Be it known that I, ISAAC H. GARRETSON, of Richland, in Keokuk county, in the State of Iowa, have invented a new and Improved Method or Process of Making Brick, Tile, and similar articles; and I hereby declare that the following is a full, clear, and exact description thereof, reference being had to the accompanying drawings, making part of this specification.

The nature of my invention consists in an improved process of compacting the material in the mold, by which I produce an article that is homogeneous throughout and more compact than by the methods now in use.

To enable others to understand and use my invention, I will proceed to describe it.

In the process now in use by which brick are made from "dry clay," as it is termed, and also in most other cases, the clay or other material is placed in a suitable mold, and pressure is then applied. In such cases experience shows that a brick thus made will have the particles very compactly united over its outer surface and extending in to a little depth, while in its interior the particles will be less firmly and compactly united, thus rendering it more or less porous internally, as can readily be observed by breaking open any brick made by the ordinary processes or methods now in use.

The object of my invention is to remedy this defect and produce a brick which shall be homogeneous in its texture throughout, its interior portion being free from interstices or cells and as firm and solid as its exterior.

The principle of my invention consists in forming a brick by the process of tamping— that is to say, I fill a small portion of the clay properly pulverized into the mold, and then tamp or beat it with a plunger or beater, the end of which fits and enters the mold. I then add another small quantity of clay or material and tamp or beat it as before, and thus continue the operation until the mold is filled and the brick completed, when it is removed from the mold and dried and burned or baked in the usual manner. By this process of tamping or beating the clay in small quantities the moisture contained in it, and which is considerable even in what is termed "dry clay," or clay in its natural condition as dug from the bank or bed, is liberated from the particles in which it is held, and is thoroughly mixed through the entire mass, whereby the mass is rendered more homogeneous, the particles composing it being rendered more plastic and more thoroughly mixed and united. In this respect the process is found to operate similarly to that of working putty, the putty being rendered more soft and plastic and finer-grained by simply pounding it, even though no addition of oil or other liquid be made to the mass. It is also found that by this process of beating the clay the moisture which it contains is driven to the surface of the brick more than when pressure alone is applied, and the surface is thereby rendered still more plastic, by which the brick is made to assume more readily the exact shape or form of the mold, and thus to form not only a very smooth surface, but also to form very sharp angles or corners and edges, and by this means I am enabled to furnish a very fine quality of brick for fronts and similar purposes.

The continued tamping or beating given to the small quantities of material as they are successively placed in the mold has the effect of bringing the particles into a closer and more intimate union, and thus forming a more solid and homogeneous brick.

It is obvious that a variety of machines may be used to form brick by this process.

In the accompanying drawings I have shown a press for this purpose, in which A represents the tampers or beaters, their lower ends being made of a proper size and shape to enter the molds. C represents a hopper or box containing the material, and B being a slide working through openings or grooves underneath hopper C. The front end of these slides B are cut out or recessed, as shown, so that when drawn back under the hopper C the recesses will be filled with a small supply of the clay or material, and as the beater A is raised the rods G cause the slides B to move forward over the molds and deposit therein the material contained in the recess in said slide B. As the beaters descend the slides B are withdrawn out of the way of the beater under hopper C, where they are again charged with another supply of clay to be deposited in the hopper when the beater is again raised, as before, and thus the process is continued until the mold is filled and the brick completed.

E is a movable bottom placed under the mold, and forming the bottom thereof. When the brick is finished this bottom E is withdrawn and the brick is forced down through the mold, when it is removed and the bottom E returned to its place.

The beaters may be operated by a shaft, D, having attached to it arms, as shown, which come in contact with projecting shoulders on the beaters, whereby the latter are raised until the tappets or arms pass said projections, when, of course, the beaters will descend by the force of gravity. Any desired number of these molds and beaters may be arranged to operate conjointly and be driven by a single shaft, and thus the capacity of the machine may be increased at will.

It is also obvious that the machine may be so arranged as to feed a greater or less quantity of material into the mold at each stroke of the beater, or that they may be so arranged as to produce several strokes of the beater at each operation of the feeding-slides.

I am aware that brick have been made by filling a mold with material and then letting a plunger fall upon it, and also that brick have been made by filling one-half the quantity necessary to form a brick into the mold and compacting it by a plunger, and repeating the operation for the remaining half of the brick, and therefore I do claim either of these methods; but,

Having thus fully described my invention, what I claim is—

1. Making brick, tile, and similar articles by the tamping process—that is to say, by feeding in the clay or other material in small quantities and tamping or beating each small quantity thus fed in before any more material is added, as herein set forth.

2. The mechanism, constructed and operating substantially as herein described, for the purpose of making brick and similar articles.

ISAAC H. GARRETSON.

Witnesses:
   THOS. WELHAM,
   GEO. C. ANDREWS.